United States Patent [19]

Cohen

[11] Patent Number: 4,953,905
[45] Date of Patent: Sep. 4, 1990

[54] TELESCOPING DISPLAY DEVICE

[76] Inventor: Abraham Cohen, 642 Milton Ave., Lyndhurst, N.J. 07071

[21] Appl. No.: 350,165

[22] Filed: May 11, 1989

[51] Int. Cl.⁵ .......................... B25J 1/02; F16B 7/10; G09F 21/02
[52] U.S. Cl. ..................................... 294/19.1; 16/115; 40/586; 40/610; 116/173; 285/302
[58] Field of Search ........................ 294/19.1, 22–24; 16/115; 40/412, 422, 439, 586, 601, 606, 607, 610, 642, 652, 658; 52/2 R, 2 L; 116/63 P, 63 C, 173, DIG. 8, DIG. 44; 248/161, 188.5, 317, 333, 346, 544; 285/298, 302; 403/109, 345, 377; 446/176, 200, 202, 220

[56] References Cited

U.S. PATENT DOCUMENTS

| | | | |
|---|---|---|---|
| 741,360 | 10/1903 | Moseley | 446/200 X |
| 1,121,510 | 12/1914 | Kinney | 116/173 |
| 1,302,190 | 4/1919 | McCormack | 116/173 |
| 1,916,988 | 7/1933 | Pieschke | 40/412 |
| 2,458,316 | 1/1949 | Swertlow | 116/173 X |
| 2,819,547 | 1/1958 | Clements | 40/610 X |
| 3,032,362 | 5/1962 | Lovejoy | 294/19.1 |
| 3,775,887 | 12/1973 | Precourt | 40/586 X |
| 4,220,310 | 9/1980 | Jantzen et al. | 294/19.1 X |
| 4,259,803 | 4/1981 | Sittler | 40/610 X |

Primary Examiner—Johnny D. Cherry
Attorney, Agent, or Firm—M. K. Silverman

[57] ABSTRACT

An elongate message holding device consisting of telescoping conical segments surrounded by a fluid-tight cylindrical housing. An axially, centrally located conical segment is provided with a clasp which can be used to hold a card or note upon which desired information can be placed. At another end of the telescoping segments is provided a fluid input into which a fluid, e.g. air, may be blown to cause the axially located conical segment to advance in the same direction in which the pressurized air is inputted. After the axial located conical segment has advanced to an opposite end of the cylindrical housing, its base will engage an end of the conical segment which concentrically surrounds the axially located segment to advance the next annular segment and to permit the next annular segment to receive fluid input form the fluid input opening from a mouth piece. This process of advance of the conical segments repeats as each successive conical segment reaches the clasp end of the cylindrical device until all concentric cylindrical segments have expanded in the direction of fluid input to create an elongate structure having the general appearance of a pole.

1 Claim, 2 Drawing Sheets

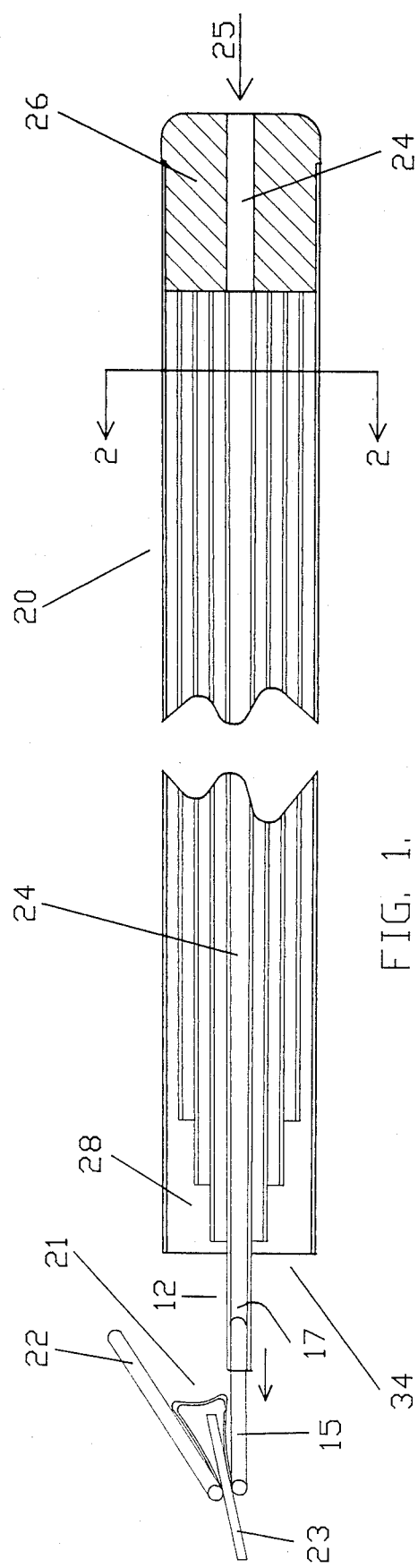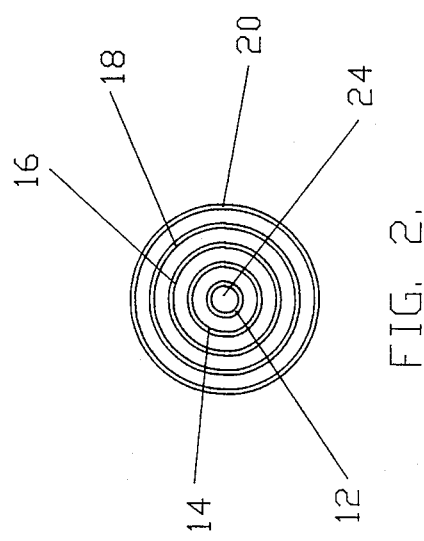

TELESCOPING DISPLAY DEVICE

BACKGROUND OF THE INVENTION

The present invention relates to a telescoping elongate device which resembles a pole having varying degrees of elongation.

A need for the instant invention derives from a number of social and commercial situations in which one party wishes to provide to a second party information written upon a card or like piece of paper for the second party to selectably read and/or remove. Such situations exist on beaches, within and between automobiles, at flea markets, and other situations in which a first party wishes to provide to a second party the option of conveniently reading or obtaining information written upon a card or the like during situations both when the first party or second party is not present or when the parties are separated by a distance of several feet.

To the knowledge of the inventor, there does not exist any prior art relevant to the inventive structure and method set forth herein.

SUMMARY OF THE INVENTION

The present invention comprises an elongate message holding device consisting of a plurality of telescoping substantially conical segments surrounded by a fluid tight cylindrical housing. An axially, centrally located conical segment thereof is provided with a clasping means which can be used to hold a card or note upon which desired information can be placed. At another end of the telescoping segments is provided a fluid input means into which a fluid, e.g., air, may be blown to cause said axially located conical segment to advance in the same direction in which the pressurized fluid is inputted. After said axially located conical segment has advanced to an opoposite end of the cylindrical housing, its base will engage an end of that conical segment which concentrically surrounds said axially located segment to thereby advance the next annular segment and to permit the next annular segment to receive fluid input from the fluid input opening from a mouthpiece. This process of advance of the cylindrical segments repeats as each successive conical segment reaches the clasp end of the cylindrical device until all concentric conical segments have expanded in the direction of fluid input to create an elongate structure having the general appearance of a pole.

It is accordingly an object of present invention to provide an easy to use longitudinally expandable device at the end of which may be displayed messages for reading by parties having an interest therein.

It is another object of the present invention to provide a telescoping structure which may be expanded through the use of air pressure provided from the mouth of a user and which, after use, may be conveniently compressed into a small, hand-held cylindrical volume.

The above and yet other objects and advantages of the present invention will become apparent from the hereinafter set forth a Detailed Description of the Invention, the Drawings, and Claims appended herewith.

A BRIEF DESCRIPTION OF THE DRAWINGS

FIG. 1 is a longitudinal cross sectional view of the inventive device.

FIG. 2 is a radial cross sectional view of FIG. 1 taken along Line 2—2 of FIG. 1.

DETAILED DESCRIPTION OF THE INVENTION

Figure 3:
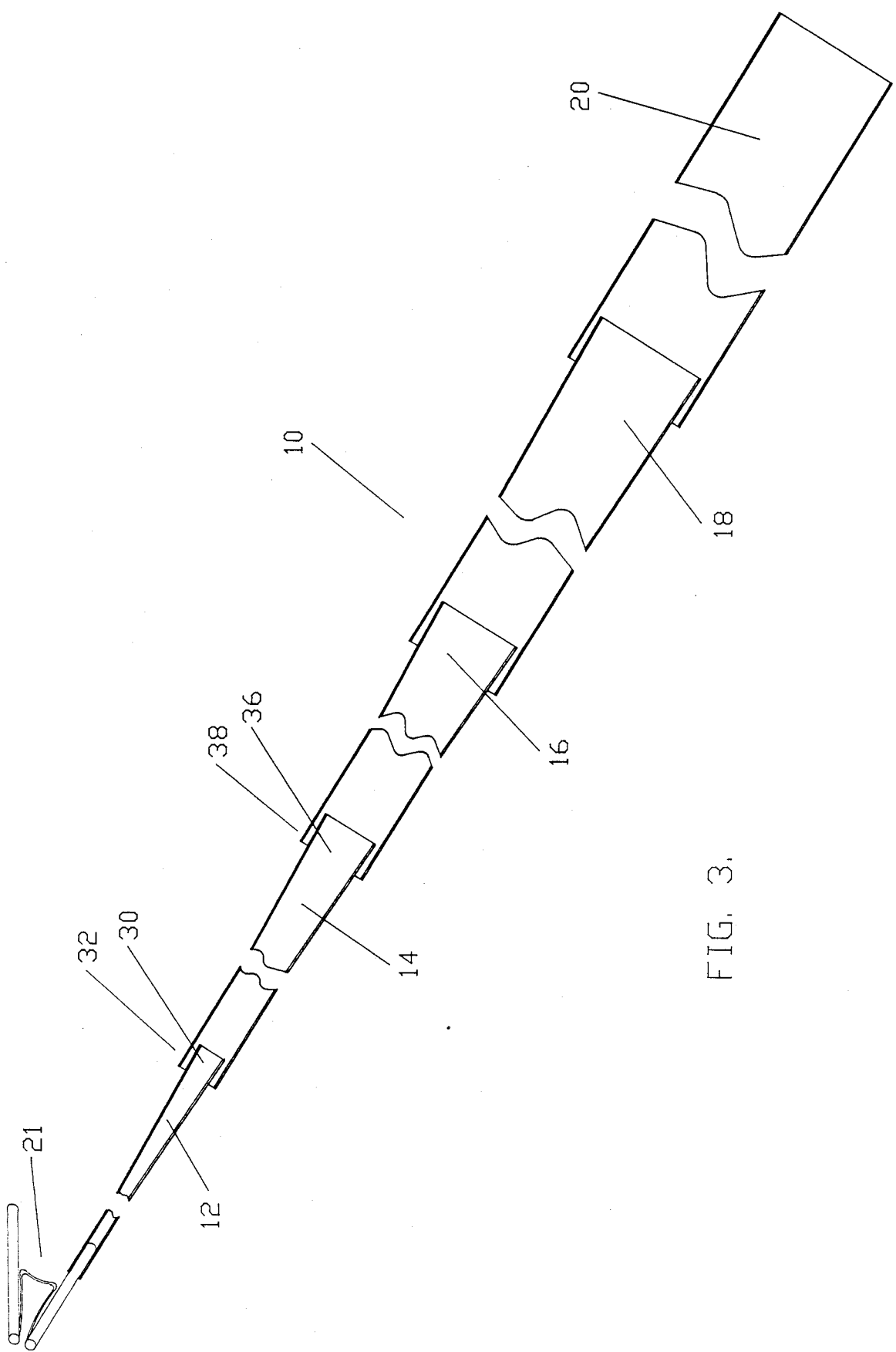
FIG. 3 is a schematic view showing the instant device in its expanded mode.

With reference to the views of FIGS. 1 and 2, the inventive structure is seen to include a cylindrical housing 20 having therein an axially located longitudinal channel 24. Channel 24 is, at a first end of the device, defined by an axial opening within a mouthpiece 26 and, with respect to the rest of the device, said channel 24 is defined by the interior diameter of an axially located cylindrical segment 12. It is noted that at the left hand end of cylindrical segment 12, there is provided a post 15 which services two functions, the first of which is that of a fluid tight plug at point 17 within the interior diameter of cylindrical element 12, and the second of which is that said post 15 forms one side of clasp means 21, while the other side thereof is formed by post 22. As may be appreciated, an appropriate card or piece of paper 23 having described thereupon a suitable message, is secured between posts 15 and 22 of clasp means 21.

With respect to the operation of the inventive device, when a fluid such as air 25 is blown into mouthpiece 26, through axial channel 24, said air will fill channel 24 until sufficient air pressure exists at the end 17 of post 15. At such point, cylindrical segment 12 will begin to advance in the direction indicated by the arrow at the left of FIG. 1. As this occurs, the exterior 30 of cylindrical segment 12 will engage the interior of end 32 of the next outwardly positioned annular cylindrical element 14. See FIG. 3. In other words, the advance of cylindrical element 12 will eventually cause base 30 of segment 12 to engage end 32 of segment 14 thereby pulling the second annular cylindrical segment 14 to the left (with reference to the view of FIG. 1). As this process continues, region 28, within cylindrical housing 20, is eventually filled by the advancing annular cylindrical segments. This is, after second annular cylindrical segment 14 passes the plane of base 34 of cylindrical housing 20, a base 36 of segment 14 engages end 38 of the next cylindrical segment 16. As may be appreciated from the view of FIG. 3, this process will, so long as pressurized air input 25 is provided, continue until all segments 12, 14, 16 and 18 have expanded to the left beyond the plane of base 34 of the housing 20 of the device.

As may be noted, each of said segments 12, 14, 16 and 18, are technically solid conical segments in which the upper base of each is slightly smaller than the lower base.

In order for the inventive structure to operate in the above described function, it has been found that the cylindrical segments 12, 14, 16 and 18 must be formed of a low density solid, such a light, resilient polymeric plastic or a bamboo. Where such material is employed, not only is the use of human lung pressure sufficient to expand the device but, as well, the device is provided with considerable flexibility such that wind or other impacting force on the expanded structure will not impair its function or render compression of the structure difficult. Thereby, after usage of the structure, posts 15 and 22 may be easily pressed in the direction of mouthpiece 26 to cause the annular cylindrical segments to re-compress within the volume of housing 20.

Thereby, the entire device may be easily carried when not in use.

Accordingly, while there has been shown and described preferred embodiment of the present invention is to be appreciated that the invention may be embodied otherwise than is herein shown and described and that, within such embodiment, certain changes may be made within the form and arrangement of the parts without departing from the underlying principles of this invention within the scope of the claims appended herewith.

Having described my invention, what I claim is new, useful and non-obvious and, accordingly, secure by letters patent of the United States is:

1. A telescoping device for the display of information, comprising:
   (a) a plurality of annularly disposed conical segments, each of said segments having a base having an outside diameter in excess of one inside diameter of that conical segment within which it is annularly disposed;
   (b) a cylindrical housing within which said plurality of conical segments, when axially telescoped within each other, may be stored;
   (c) a mouthpiece having substantially the diameter of said housing and integrally secured to one base thereof, said mouthpiece having an axial channel in fluid communication with the inside diameter of an innermost of said annular substantially conical segments;
   (d) clasping means secured at end of said innermost of said annular segments and in fluid-tight fit with the inside diameter of said end, said end of said innermost annular segment being opposite to that end in fluid communication with said mouthpiece,
   whereby by providing a pressurized fluid input to said axial channel of said mouthpiece, said innermost annular segment will be advanced in the direction of said pressurized fluid input and after a sufficient advance of said innermost annular segment, the base of said segment will engage the interior of a corresponding opposite end of the next surrounding annular segment, thereby engaging said opposite end of said next surrounding segment to result in the successive expansion of said plurality of annular substantially conical segments, in which information may be held by said clasping means after said expression has occurred.

* * * * *